United States Patent
Hughes

(10) Patent No.: US 12,441,989 B2
(45) Date of Patent: Oct. 14, 2025

(54) SERUM-FREE MEDIUM FOR AVIAN VACCINE PRODUCTION AND USES THEREOF

(71) Applicant: BOEHRINGER INGELHEIM ANIMAL HEALTH USA INC., Duluth, GA (US)

(72) Inventor: William Troy Hughes, Braselton, GA (US)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 838 days.

(21) Appl. No.: 17/414,759

(22) PCT Filed: Jan. 16, 2020

(86) PCT No.: PCT/US2020/013776
§ 371 (c)(1),
(2) Date: Jun. 16, 2021

(87) PCT Pub. No.: WO2020/150411
PCT Pub. Date: Jul. 23, 2020

(65) Prior Publication Data
US 2022/0186191 A1 Jun. 16, 2022

Related U.S. Application Data

(60) Provisional application No. 62/793,674, filed on Jan. 17, 2019.

(51) Int. Cl.
*C12N 7/00* (2006.01)
*C12N 5/073* (2010.01)

(52) U.S. Cl.
CPC ............ *C12N 7/00* (2013.01); *C12N 5/0603* (2013.01); *C12N 2500/10* (2013.01); *C12N 2500/92* (2013.01); *C12N 2710/16351* (2013.01); *C12N 2710/24051* (2013.01); *C12N 2720/10051* (2013.01)

(58) Field of Classification Search
CPC .... C12N 7/00; C12N 5/0603; C12N 2500/10; C12N 2500/92; C12N 2710/16351; C12N 2710/24051; C12N 2720/10051
See application file for complete search history.

(56) References Cited

U.S. PATENT DOCUMENTS

| | | | |
|---|---|---|---|
| 6,110,713 A | 8/2000 | Hanson | |
| 10,527,551 B2 * | 1/2020 | Grillberger | G01N 21/6486 |
| 12,331,341 B2 * | 6/2025 | Oshodi | C12N 5/005 |
| 2006/0233834 A1 | 10/2006 | Guehenneux et al. | |
| 2014/0273095 A1 * | 9/2014 | Oshodi | C12P 21/00 |
| | | | 435/254.2 |
| 2018/0223249 A1 * | 8/2018 | Johnson | C12N 5/0018 |

FOREIGN PATENT DOCUMENTS

| | | | |
|---|---|---|---|
| CN | 1681917 A | 10/2005 | |
| CN | 1756837 A | 4/2006 | |
| CN | 101194012 A | 6/2008 | |
| CN | 101200705 A | 6/2008 | |
| CN | 101668539 A | 3/2010 | |
| EP | 1985305 | 10/2008 | |
| EP | 1985305 A1 * | 10/2008 | ............ A61K 39/00 |
| RU | 2642269 C9 | 10/2018 | |
| WO | WO-9815614 A1 * | 4/1998 | .......... C12N 5/0043 |
| WO | WO-9957246 A1 * | 11/1999 | .......... C12N 5/0043 |
| WO | 2004005493 A1 | 1/2004 | |
| WO | 2004078955 | 9/2004 | |
| WO | WO-2004078955 A1 * | 9/2004 | ............... C12N 7/00 |
| WO | WO-2005062709 A2 * | 7/2005 | ............ A61K 39/12 |
| WO | 2006108846 A1 | 10/2006 | |
| WO | WO-2007022151 A2 * | 2/2007 | ............ A61K 39/12 |
| WO | 2007077217 A2 | 7/2007 | |

OTHER PUBLICATIONS

Wright et al. (Wright, A. K. A., Bangert, M., Gritzfeld, J. F., Ferreira, D. M., Jambo, K. C., Wright, A. D., Collins, A. M., & Gordon, S. B. (2013). Experimental human pneumococcal carriage augments IL-17A-dependent T-cell defence of the lung. PLoS Pathogens, 9 (3), e1003274-e1003274.) (Year: 2013).*

Kamber, T., Pothier, J. F., Pelludat, C., Rezzonico, F., Duffy, B., & Smits, T. H. M. (2017). Role of the type VI secretion systems during disease interactions of Erwinia amylovora with its plant host. BMC Genomics, 18(1), 628-628. (Year: 2017).*

Jenny C et al: "Evaluation of a Serum-free Medium for the Production of rAAV-2 using HeLa Derived Producer Cells", Cytotechnology, Kluwer Academic Publishers, Do, vol. 49, No. 1, Sep. 1, 2005 (Sep. 1, 2005), pp. 11-23, XP019236901, ISSN: 1573-0778, DOI: 10.1007/S10616-005-5361-Z.

De-Li Zhang: "Studies on Isolation, Serum-free Cultivation and Manufacture of Mink Enteritis Virus Optimized for Vaccine Preparation", Biologicals., vol. 25, No. 1, Mar. 1, 1997 (Mar. 1, 1997), pp. 103-111, XP55677389, GB ISSN: 1045-1056, DOI: 10.1006/biol. 1996.0065.

Anonymous: "Trypton (pflanzlich) suitable for microbiology, meat-free alternative I Sigma-Aldrich", Aug. 10, 2022 (Aug. 10, 2022), XP093138208, Retrieved from the Internet: URL:https://www.sigmaaldrich.com/DE/de/product/sial/16922 [retrieved on Mar. 6, 2024].

Sigma-Aldrich, Tryptone (vegetable) suitable for microbiology, meat-free alternative, Aug. 10, 2022, https://www.sigmaaldrich.com/GB/en/product/sial/16922 [retrieved on May 15, 2024].

(Continued)

*Primary Examiner* — Janet L Andres
*Assistant Examiner* — Carey Alexander Stuart
(74) *Attorney, Agent, or Firm* — Shanyun Lu; Steffan Finnegan

(57) ABSTRACT

A method includes cultivating primary cells in a serum-free medium supplemented with peptides and peptones derived from plant or vegetable sources. The method for the cultivation of primary cells may be one step in a method for the amplification of viruses, such as poxviruses.

11 Claims, No Drawings

(56) References Cited

OTHER PUBLICATIONS

Sigma-Aldrich, Tryptone pancreatic digest of casein, suitable for microbiology, Aug. 11, 2022, https://www.sigmaaldrich.com/GB/en/product/sial/t9410 [retrieved on May 23, 2024].

ThermoFisher Scientific, Technical guide to peptones, supplements, and feeds, 2019, https://assets.thermofisher.com/TFS-Assets/BPD/brochures/peptones-supplementsfeedstechnical-reference-guide.pdf [retrieved on Jun. 7, 2024].

Nasri, Protein hydrolysates and biopeptides: production, biological activities, and applications in foods and health benefits. A Review, [Abstract], Adv. Food. Nutr. Res., 2017, 81:109-159.

\* cited by examiner

SERUM-FREE MEDIUM FOR AVIAN VACCINE PRODUCTION AND USES THEREOF

CROSS-REFERENCE TO OTHER APPLICATIONS

This application claims priority to U.S. provisional patent application 62/793,674, which was filed on Jan. 17, 2019, and is herein incorporated by reference in its entirety

FIELD OF THE INVENTION

The present disclosure relates generally to cell culture medium formulations and to methods for viral propagation and multiplication of cells in culture, in particular for producing vaccines. Specifically, the present disclosure provides serum-free, defined cell culture medium formulations that facilitate the in vitro cultivation of primary or secondary cell cultures for the production of avian vaccines, wherein the growth medium comprises a vegetarian diet. Further, the present disclosure provides methods for viral propagation and multiplication of cells in culture using the serum-free growth medium. The culture media of the present disclosure are particularly suitable for adherent culture of fibroblast cells, such as chicken embryonic fibroblasts.

BACKGROUND OF THE DISCLOSURE

Most viral vaccines are manufactured from cell culture systems viral yield is critical in cell culture based vaccine manufacturing, not only because higher yield results in more vaccine produced quicker, but also because it is important for determining the economic viability of a cell culture based vaccine manufacturing method.

The cells used for virus/vaccine production may be cell lines or primary animal. Chicken embryo fibroblasts (CEF cells) are an example of primary cells used for virus production. Attenuated viruses are commonly propagated in CEF cell cultures cell growth and propagation in vitro require culturing conditions that include a medium that can support cell growth and propagation. Conventionally, for culturing mammal-derived cells the commonly used cell culture medium comprise a rich salt solution containing vitamins, amino acids, essential trace elements, and sugars. In addition, growth hormones, enzymes, and biologically active proteins required for cell growth are usually added as a supplement to the medium in the form of an animal blood derived serum or alternatively protein components separated from animal blood derived serum.

Examples of animal blood derived serum products are fetal calf serum, chicken serum, horse serum and porcine serum. These sera are derived from fractionated blood, from which the red blood cells and the white blood cells have been removed. Primary cells, such as CEF cells are even more dependent on animal serum sources than cell lines. Thus, primary cells are usually cultivated in cell culture media comprising 5 to 10% serum, in most cases fetal calf serum (FCS).

Animal blood derived serum products may contain adventitious pathogenic agents such as viruses or prion proteins. There by giving rise to safety concerns with using serum due to the potential risk that these pathogenic agents may be transmitted to the animal/human to be treated or vaccinated with the vaccine or any other pharmaceutical product produced in cell culture supplemented with serum. These concerns are exemplified by the commonly used bovine serum supplement, where one of the many major problems/risks associated with its use is the possibility of transmitting the agent causing bovine spongiform encephalopathy (BSE) to the animals/humans that come into contact with products/vaccines produced from cell cultures using bovine serum supplementation. Accordingly, the use of a serum-free medium would be advantageous in order to eliminate contaminants in serum such as viruses or pathogenic prions which must not remain in final products, e.g. recombinant proteins or viral vaccine vectors.

In view of the possible risk associated with the use of animal sera in cell culture it has become clear that development of a serum-free medium which does not contain any animal derived proteins or peptides would be preferred. Specifically, replacement of animal derived proteins or peptides with those proteins, peptides or lipids separated from non-animal sources would alleviate the safety concerns associated with serum.

There remains a need for strategies to improve serum-free vaccine manufacturing.

SUMMARY OF THE INVENTION

The present disclosure provides, a serum-free culture medium that is capable of growing a wide range of both suspension and monolayer cells while being capable of supporting avian vaccine production.

The present disclosure provides, a serum-free culture medium comprising various inorganic salts, carbohydrates, amino acids, buffering agents, vitamins, and compounds to simulate the natural cell environment. If desired, many of the amino acids, carbohydrates, salts, vitamins and compounds may be obtained from a commercially available synthetic medium free of protein or growth promoting agents, such as Eagle's Minimal Essential Medium (EMEM) or Dulbecco's Modified Eagle Medium (DMEM).

The present disclosure provides, a serum-free culture medium comprising tryptone (peptides and peptones) derived from plant or vegetable sources.

In addition, the present disclosure also provides a method for using a serum-free medium for culturing cells and cell lines for viral propagation and multiplication.

DETAILED DESCRIPTION

An objective of the present disclosure is to develop a serum-free culture medium that is capable of growing a wide range of both suspension and monolayer cells while being capable of supporting avian vaccine production.

The medium of the present disclosure also includes various inorganic salts, carbohydrates, amino acids, buffering agents, vitamins, and compounds to simulate the natural cell environment. If desired, many of the amino acids, carbohydrates, salts, vitamins and compounds may be obtained from a commercially available synthetic medium free of protein or growth promoting agents, such as EMEM or DMEM. In addition to the above-described serum substitute various additional amino acids, salts, carbohydrates, vitamins, and compounds, such as yeast extract and antibiotics, may be added to the medium in order to compose the complete serum-free medium of the present disclosure.

Another objective of the present disclosure relates to a process for utilizing a serum-free medium for culturing cells and cell lines for viral propagation and multiplication. The serum-free medium includes tryptone (peptides and peptones) derived from plant or vegetable sources.

The present disclosure provides a method for cultivation of primary cells, in particular primary avian cells, in serum free medium and a method for the production of virus in primary cells under serum free conditions. The instant method for the cultivation of primary cells may be characterized in that the cells are cultivated in a serum free medium supplemented with peptides and peptones derived from plant or vegetable sources.

It is noted that in this disclosure and particularly in the claims, terms such as "comprises", "comprised", "comprising" and the like can mean "includes", "included", "including", and the like; and that terms such as "consisting essentially of" and "consists essentially of" allow for elements not explicitly recited, but exclude elements that are found in the prior art or that affect a basic or novel characteristic of the invention.

Unless otherwise noted, technical terms are used according to conventional usage. Definitions of common terms in molecular biology may be found in Benjamin Lewin, Genes V. published by Oxford University Press, 1994 (ISBN 0-19-854287-9); Kendrew et al. (eds.), The Encyclopedia of Molecular Biology, published by Blackwell Science Ltd., 1994 (ISBN 0-632-02182-9); and Robert A. Meyers (ed.), Molecular Biology and Biotechnology: a Comprehensive Desk Reference, published by VCH Publishers, Inc., 1995 (ISBN 1-56081-569-8).

The singular terms "a," "an," and "the" include plural referents unless context clearly indicates otherwise. Similarly, the word "or" is intended to include "and" unless the context clearly indicate otherwise. The word "or" means any one member of a particular list and also includes any combination of members of that list.

The term "primary cells" as used in the present description is well known to a person skilled in the art. Without being restricted to the following definition the term "primary cells" may refer to cells that have been freshly isolated from an animal or human tissue, organ or organism, wherein the cells are not able to continuously and indefinitely replicate and divide. Usually, primary cells divide in cell culture less than 100 times, often less than 50 times, often less than 25 times. Thus, primary cells have not undergone an immortalizing event. An examples for primary cells are animal fibroblasts, such as but not limited to, Chicken Embryo Fibroblasts (CEF cells). Methods of isolating primary cells are well known Generally, primary cell cultures are derived directly from tissues, organs or embryos by, subjecting the tissues, organs or embryos to protease treatment to obtain single cells.

The method of the present disclosure is not restricted to cells that form monolayers. According to an alternative embodiment the method according to the present disclosure may be used for all other types of primary cells, such as cells naturally growing in suspension culture (e.g. lymphocytes or other types of blood cells) or cells that naturally would grow as adherent cells but have been adapted to growing in suspension culture.

As shown below the cells can also be used for the serum free amplification of viruses that might be useful as vaccines.

Generally, viruses, including wild-type viruses, attenuated viruses, and recombinant viruses that are used as vaccines, are grown and amplified under serum containing conditions. However as noted above, there is a potential risk that serum contains pathogenic agents may be transmitted to the animal/human treated or vaccinated with the vaccine. To reduce the risk of contaminants in the vaccine, it is a further aspect of the disclosure to passage and/or cultivate under serum free conditions those viruses that previously have been amplified under serum containing conditions and are intended to be used as vaccine.

It was unexpected that primary cells naturally growing as adherent cells can effectively attach to the surface of the cell culture vessel without forming unacceptable amounts of aggregates and can be grown in the logarithmic phase in the absence of serum since as it is generally believed that primary cells are dependent on a multitude of different factors and components contained in serum. Moreover, it is believed that adherent cells form non-viable aggregates that do not attach to the surface of the cell culture vessel, when cultivated in serum free medium. Thus, it was unexpected that it is sufficient to supplement a serum free medium with peptides and peptones derived from plant or vegetable sources to obtain attachment and growth of adherent primary cells. Moreover, it was also unexpected that primary cells cultivated in suspension culture can be grown with the media used in the method according to the present disclosure.

In particular, it was surprising that primary avian cells, such as the instant Chicken Embryo Fibroblasts (CEF), can be cultivated to attach to the surface of a cell culture vessel without forming unacceptable amounts of aggregates in a serum free medium supplemented with peptides and peptones derived from plant or vegetable sources. Avian cells are otherwise understood to grow adversely in serum free medium not comprising growth factors or attachment factors found in serum, i.e., it was unexpected that the poor growth properties of primary avian cells could be improved significantly by supplementing the serum free medium with peptides and peptones derived from plant or vegetable sources.

The term "cultivation of cells" in a serum free medium in the context of adherent primary cells refers to the seeding of the cells into the culture vessel in a serum free medium, to the growing of the cells in a serum free medium in the logarithmic phase until a monolayer is formed and/or to the maintenance of the cells in serum free medium as soon as the monolayer is formed. The term "cultivation of cells" in a serum free medium also refers to a method in which all of the above mentioned steps are performed with serum free medium, so that no animal serum products are present during the whole cultivation process of the cells. Thus, in a more general meaning the term "cultivation of cells in a serum free medium" refers to the fact that all media leading to the formation of a monolayer are serum free media. The media used in all of the above steps may be supplemented with peptides and peptones derived from plant or vegetable sources.

The term "cultivation of cells" in a serum free medium in the context of cells growing in suspension culture refers to the seeding of the cells into the culture vessel in a serum free medium, the growing of the cells in a serum free medium in the logarithmic phase and/or the maintenance of the cells in serum free medium as soon as the saturation density at which no further replication occurs is obtained. The term "cultivation of cells" in a serum free medium refers to a method in which all of the above mentioned steps are performed with serum free medium, so that no animal serum products are present during the whole cultivation of the cells. The media used in all of the above steps may be supplemented with peptides and peptones derived from plant or vegetable sources.

The term "serum-free" medium refers to any cell culture medium that does not contain sera from animal or human origin. Suitable cell culture media are known to the person skilled in the art. These media comprise salts, vitamins, buffers carbohydrates, amino acids and other compounds, such as yeast extract and antibiotics.

The media used according to the method of the present disclosure, in particular the media used for adherent cells such as CEF cells, contain peptides and peptones derived from plant or vegetable sources. An example of the peptides and peptones is vegetable tryptone.

The serum free medium may further comprise one or more additives selected from microbial extracts, plant extracts and extracts from non-mammalian animals. The microbial extract may be a yeast extract or yeastolate ultrafiltrate. The plant extract may be a rice extract or soya extract. The extract from non-mammalian animals may be a fish extract.

This serum free medium may also be used with the addition of animal blood derived serum products (eg. 0.5 to 30%) as a means of reducing the overall serum concentration typically needed (5 to 10%) to support the growth of primary adherent cells or cell lines.

Amplification of a virus may comprise the following steps: in the first step primary cells are cultivated according to the method described above, i.e. primary cells are cultivated in a serum free medium supplemented with peptides and peptones derived from plant or vegetable sources. All conditions and definitions given in the description of the method for the cultivation of primary cells above also apply to the definition of the first step of the method for the amplification of virus according to this embodiment of the present disclosure. In a second step the primary cells are infected with the virus. In the third step the infected cells are incubated in serum free medium until progeny virus is produced. Finally, in a fourth step, the virus is isolated from infected cells, or the cells harboring the virus are harvested as to keep these infected cells viable.

Methods for infecting primary cells according to the second step of instant method for virus amplification are known. By way of example the virus may simply be added to the medium. Alternatively, the medium may be removed and the virus may be added to fresh medium, which in turn is added to the cells. To obtain an efficient infection the amount of the virus/medium suspension should be as low as possible to have a high virus concentration. After the attachment of the virus additional medium may be added.

In the third step of the instant method, the infected cells are cultivated in serum free medium until progeny virus is produced.

The progeny virus may be concentrated and purified according to methods known to the person skilled in the art.

The methods according to the present disclosure relates to a method for the amplification of a poxvirus comprising the following steps: (I) cultivating primary cells according to a method as described above, i.e. a method in which the primary cells are cultivated in serum free medium supplemented with peptides and peptones derived from plant or vegetable sources, (II) infecting the primary cells with the poxvirus, (III) cultivating the infected cells in serum free medium until progeny virus is produced and (iv) isolating the virus from the infected cells. Viruses isolated according to the instant method are free of any products and/or infectious agents comprised in animal sera.

The process of passaging, cultivating, and/or purification under serum free conditions to those viruses that previously have been amplified under serum containing conditions is termed "re-derivation". Such a re-derivation may also be used if it is not completely clear how a master seed was obtained that is used for the production of a vaccine. A re-derivation under serum-free drastically reduces the risk of contaminations in the vaccine, in particular of undesired infectious agents.

The methods according to the present disclosure relate to cultivating primary avian cells and to amplifying a virus, wherein the virus is the virus that is to be re-derived. For example, the instant methods are useful for the re-derivation of viruses and virus stocks, in particular for stocks that have been, or may have previously been passaged in serum containing medium.

One passage of the starting material, i.e. of the virus to be re-derived under serum free conditions, may be sufficient for the re-derivation of a virus. The term "passaging" refers to the steps of cultivating cells under serum free conditions, infection of the cells with the virus to be re-derived and obtaining the virus produced in the infected cells. Although one passage might be sufficient, it may be preferable to passage the virus several times under serum free conditions. In this case the virus obtained from the first passaging step is used to again infect fresh cells. The passaging under serum free conditions may be combined with one or more methods for the purification of a virus under serum free conditions. The total number of passages, optionally by including purification is in a range of 1 to more than 10, such as 3 to 8 or 4 to 6. Techniques of purification are standard virological methods practiced by those skilled in the art.

As discussed previously, it is understood by those skilled in the art that primary avian cells grow adversely under serum free conditions. The additional stress associated with a poxvirus infection may be expected to cause the already stressed cells to die before a significant amplification of the poxvirus occurs. Surprisingly, avian cells grown according to the present method, in a serum free medium supplemented with peptides and peptones derived from plant or vegetable sources, effectively support viral replication and amplification of poxviruses.

The poxvirus is preferably an orthopoxvirus. Examples of orthopox viruses are avipoxviruses and vaccinia viruses.

The term "avipoxvirus" refers to any avipoxvirus, such as Fowlpoxvirus, Canarypoxvirus, Uncopoxvirus, Mynahpoxvirus, Pigeonpoxvirus, Psittacinepoxvirus, Quailpoxvirus, Peacockpoxvirus, Penguinpoxvitus, Sparrowpoxvirus, Starlingpoxvirus and Turkeypoxvirus Preferred avipoxviruses are Canarypoxvirus and Fowlpoxvirus.

The term "Marek's disease virus" refers to any of the alphaherpesvirus sertotypes used to produce Marek's disease vaccines including, but not limited to viral serotypes 1, 2, and 3.

An objective of the present disclosure is to develop a method for vaccine production, in particular poxvirus vaccines obtained by the above-described method. According to a preferred embodiment the poxvirus is a Fowlpox (FP) virus.

Another objective of the present disclosure is to develop a method for vaccine production utilizing Marek's Disease vaccine (serotypes 1, 2, and 3) production in a serum-free medium.

Another objective of the present disclosure is to develop composition comprising a virus, in particular a recombinant Marek's serotype 3 virus (HVT) produced by the method according to the present disclosure. Due to the method for amplification of the virus the composition is free of any products and/or infectious agents comprised in animal sera. In contrast, compositions comprising viruses produced according to conventional methods comprise residual compounds derived from animal serum. This is especially the case for compositions comprising Marek's virus vaccines produced according to conventional methods, such as the HVT virus serotype.

Another objective of the present disclosure is to develop a method for vaccine production utilizing Infectious Bursal Disease vaccine production in a serum-free medium.

Another objective of the present disclosure is to develop a method for the treatment or vaccination of an animal, including a human, in need thereof, comprising the administration of a virus as defined above or a composition as defined above to the animal or human body.

The present disclosure will be better understood in connection with the following examples, which are intended as an illustration of and not a limitation upon the scope of the disclosure.

EXAMPLES

Example 1: Primary Chicken Embryonic Fibroblasts (CEF) Cell Culture

Cell Culture Preparation

Enzyme preparation; TrypLE Select Enzyme (1×) from GIBCO was used without further dilution.

Growth media preparation; medium was prepared comprising EMEM media and VEGITONE (1×) from SIGMA as a ~5% VEGITONE v/v in EMEM media.

Digestion of embryos; embryos were washed three times in 50 mL Phosphate-Buffered Saline (PBS) from GIBCO and subsequently digested in a TrypLE solution four times, with each digestion period lasting five minutes.

Cells were collected into beakers with a 50/50 VEGITONE and EMEM solution, and rinsed with cell preparation media (5% VEGITONE v/v in EMEM media). Cells were centrifuged at 750 RPM for twelve minutes and stored at 2-7° C. for up to 72 hours.

A total volume of 110 mL of cells were collected with a cell density of $6.0 \times 10^6$ cells/mL.

The primary cell culture vessels (6 in total) were each prepared in accordance with Table 1 below.

TABLE 1 primary cell culture vessel conditions.

| Container | No. RB | Vol. EMEM (mL) | Cells per (mL) | Vol. cells (mL) | Vol. VEGITONE (mL) |
|---|---|---|---|---|---|
| Roller bottle (RB) | 6 | 285 | $6.0 \times 10^6$ | 18 | 15 |

The roller bottles were 100% confluent after 48 hours of incubation at 35-39.0° C. and 0.2 RPM.

HVT Virus Passage in Cell Culture

Five roller bottles were seeded with a primary (1°) CEF cell culture at a rate of 100 million CEF cells per bottle. 1× VEGITONE was used at a rate of ~5% in the medium (EMEM) to provide additional nutrition to the CEF cells. The roller bottles were 100% confluent after 48 hours of incubation at 39.0° C. and 0.2 RPM.

The CEF cells were inoculated with 1 ampule of HVT SR-3, then incubated at 35-39° C. and 0.2 RPM, and after ~46 hours the cytopathic effect (CPE) was determined to be about 60%. This first passage of these HVT infected CEF cells (X+1) were harvested by trypsinization, followed by centrifugation and resuspension in vials containing 6 different cryo-preservation media formulations. The vials were then frozen to about −110° C. using a controlled rate freezer. The resuspended vials were labelled to form X+1(1) for condition 1, X+1(2) for condition 2, X+1(3) for condition 3, X+1(4) for condition 4, X+1(5) for condition 5, and X+1(6) for condition 6. Cryo-preservation media and freezing data are shown in Table 2 below.

TABLE 2

Cryo-preservation media and freezing data.
Various cryo-preservatives in 1x EMEM with 0.35 g/L Sodium Bicarbonate

| Condition | % DMSO | % Calf Serum[1] | % LB Veg[2] | % MC[3] | Cell Count Pre-Freeze (0.2 mL Dose) | Titer Pre-Freeze (0.2 mL Dose)[4] | Cell Count Post-Freeze (0.2 mL Dose) | Titer Post-Freeze (0.2 mL Dose)[4] |
|---|---|---|---|---|---|---|---|---|
| 1 (control) | 3.5 | 15 | 0 | 0 | 12 k/dose | 4040 | 15 k/dose | 4820 |
| 2 | 3.5 | 0 | 0 | 0 | 23 k/dose | 4880 | 11 k/dose | 4340 |
| 3 | 3.5 | 0 | 5 | 0 | N/A | N/A | 18 k/dose | 4560 |
| 4 | 5.0 | 0 | 0 | 0 | 16 k/dose | 4160 | 13 k/dose | 4940 |
| 5 | 10 | 0 | 0 | 0 | 15 k/dose | 4120 | 9 k/dose | 4340 |
| 6 | 10 | 0 | 0 | 10 | 14 k/dose | 4400 | 12 k/dose | 4480 |

[1]Irradiated Calf Serum from RMBio,
[2]1x LB VEGITONE from SIGMA,
[3]1% Methyl Cellulose (4000CP) from SIGMA in 1% PBS-solution, and
[4]Samples diluted at a rate of 0.5 mL formulated vaccine into 49.5 mL Marek's diluent then diluted 1:500 for titration and viable cell count (1:1 trypan Blue).

Example 2: Primary Chicken Embryonic Fibroblasts (CEF) Cell Culture

Cell Culture Preparation

Enzyme preparation; TrypLE Select Enzyme (1×) from GIBCO was used without further dilution.

Growth media preparation; medium was prepared comprising RS-EMEM media and VEGITONE (1×) from SIGMA as a ~5% VEGITONE v/v in EMEM media.

Digestion of embryos; embryos were washed three times in 1000 mL Phosphate-Buffered Saline (PBS) from GIBCO and subsequently digested in 50 mL of TrypLE solution four times, with each digestion period lasting five minutes.

Cells were collected into beakers with 20 mL of 20% VEGITONE in EMEM and rinsed with 10 mL of cell preparation media (5% VEGITONE v/v in EMEM media). Cells were centrifuged at 750 RPM for twelve minutes and stored at 2-7° C. for up to 72 hours.

A total volume of 200 mL of cells were collected with $28 \times 10^6$ cells/mL.

The primary cell culture vessels (12 in total) were each prepared in accordance with Table 3 below.

TABLE 3 primary cell culture vessel conditions.

| Container | No. RB | Vol. EMEM (mL) | No cells per (mL) | Vol. cells (mL) | Vol. VEGITONE (mL) |
|---|---|---|---|---|---|
| Roller bottle (RB) | 12 | 285 | $2.8 \times 10^7$ | 16 | 15.0 |

HVT Virus Passage in Cell Culture Second Passage

Ten 850 cm² roller bottles were seeded with a primary (1°) CEF cells at a rate of 450 million CEF cells per roller bottle and incubated at 35-39.0° C. and 0.15 RPM. 1× VEGITONE was used at a rate of ~5% in the medium (EMEM) to provide nutrition to the CEF cells.

One roller bottle containing the CEF cell suspension was inoculated with 1 mL of X+1(2) from Table 2 and incubated at 35-39.0° C. and 0.15 RPM. After ~50 hours of inoculation the cytopathic effect (CPE) was determined to be about 60%. This second passage of these HVT infected cells (X+2) were harvested using 1×TrypLE Select and centrifugation at 750×g for 15 minutes to pellet cells. The pelleted cells were resuspended in PBS containing 5% 1×LB VEGITONE and 0.1% methyl cellulose. 2.0 mL of this cell suspension was added to the remaining 9 roller bottles to produce the third passage of HVT infected CEF cells (X+3).

HVT Virus Passage in Cell Culture Third Passage

Nine roller bottles containing the CEF cell suspension was inoculated with 2.0 mL of second passage cells (X+2) and incubated at 35-39.0° C. and 0.15 RPM. After ~48 hours of inoculation the Cytopathic effect (CPE) was determined to be about 75-80%. Each roller bottle containing the third passage cells (X+3) were harvested using 1×TrypLE Select and centrifugation at 750×g for 15 minutes to pellet cells. The TrypLE Select was neutralized with about 20 mL EMEM containing 10% VEGITONE prior to centrifugation. The pelleted cells were resuspended in two different cryo-preservation medias, and frozen using a controlled rate freezer. Cryo-preservation media and freezing data are shown in Table 4 below.

TABLE 4

Cryo-preservation media and freezing data.

| Condition | % DMSO | % LB Veg[1] | % MC[2] | Medium used to make volume 100 mL | Titer Post-Freeze (0.2 mL Dose)[3] |
|---|---|---|---|---|---|
| 1 | 10 | 0 | 0.1 | RS-EMEM | 7160 |
| 2 | 10 | 5 | 0.1 | PBS | 4680 |

[1]1× LB VEGITONE form SIGMA,
[2]1% Methyl Cellulose (4000CP) from SIGMA in 1% PBS-solution.

Exemplary media formulations used for CEF cell culture are shown in Table 5 and Cryo-Preservation of CEF cells or CEF cells infected with HVT Virus is shown in Table 6.

TABLE 5

CEF cell culture media formulation. Amounts shown to formulate 1 L serum free medium.

| Component | Amount/Liter |
|---|---|
| EMEM Powder (Sigma M1018) | 10-12 grams |
| LB Broth, VEGITONE (Sigma 28713) | 0.5-2.0 grams |
| Sodium Bicarb | 0.35-1.0 grams |
| Antibiotic Solution | 0-20 mL |
| Sterile DI Water | q.s. to 1000 mL |

TABLE 6

CEF/viral cryo-preservation media. Amounts shown to formulate 1 L medium.

| Component | Amount/Liter |
|---|---|
| EMEM Powder (Sigma M1018) | 10-12 grams |
| Sodium Bicarb | 0.35-1.0 grams |
| Dimethyl Sulfoxide (DMSO) | 50 mL |
| Antibiotic Solution | 0-20 mL |
| Sterile DI Water | q.s. to 1000 mL |

Using a serum free culture medium according to Table 5 resulted in a HVT viral yield comparable to batches that were produced using the conventional growth media comprising approximately 6% calf serum (Table 7) under similar growth/incubation conditions.

TABLE 7

Recombinant HVT Virus Stock yield data.

| Batch | Cells/RB In (log) | Cells/RB Out (log) | % Recovered | PFU/RB (log) | Batch Efficiency* |
|---|---|---|---|---|---|
| Conventional Batch 1 | 9.2 | 8.7 | 26.5% | 8.2 | 0.095 |
| Conventional Batch 2 | 9.2 | 8.8 | 33.1% | 8.2 | 0.095 |
| Serum Free Batch 1 | 8.4 | 7.9 | 30.7% | 7.5 | 0.141 |

*Batch efficiency is the total PFU recovered per roller bottle divided by the total number of CEF cells that were seeded into the roller bottle.

Example 3: Growth of Fowlpox Vaccine Virus, Bursal Disease Vaccine Virus, and Marek's Disease Vaccine Virus (Serotypes 1, 2, and 3) in Serum Free Media Using a serum free culture medium according to Table 5 to grow CEF cells infected/inoculated with various stock virus' in accordance with Table 8 below and subjected to similar growth conditions resulted in an observed CPE of at least 50% and viral replication as shown in Table 8.

TABLE 8

Vaccine virus and resulting yield data.

| Vaccine Virus | CEF Cell Density/RB | Volume of Serum Free Media/RB | Hours Post Inoculation | Observed CPE Percentage | Viral Replication Observed |
|---|---|---|---|---|---|
| Serotype 1 (Rispens) | $10^8$ to $10^{10}$ | 200 to 350 mL | 48 to 120 Hours | 50 to 80% | Yes |
| Serotype 2 (SB-1) | $10^8$ to $10^{10}$ | 200 to 350 mL | 48 to 120 Hours | 50 to 80% | Yes |
| Serotype 3 (HVT) | $10^8$ to $10^{10}$ | 200 to 350 mL | 16 to 120 Hours | 50 to 80% | Yes |
| Infectious Bursal Disease Virus | $10^8$ to $10^{10}$ | 200 to 350 mL | 20 to 72 Hours | ≥80% | Yes |
| Recombinant Fowlpox virus | $10^8$ to $10^{10}$ | 200 to 350 mL | 48 to 96 Hours | ≥80% | Yes |

The present invention is not to be limited in scope by the specific embodiments described herein. Indeed, various modifications of the invention in addition to those described herein will become apparent to those skilled in the art from the foregoing description.

The invention claimed is:

1. A culture medium which comprises: a) basal media free of human or animal protein, and b) plant-derived tryptone, wherein the culture medium is used for viral propagation in animal cells.

2. The culture medium of claim 1, wherein the basal media is Eagle's Minimal Essential Medium (EMEM).

3. The culture medium of claim 1, wherein the basal media is Dulbecco's Modified Eagle Medium (DMEM).

4. The culture medium of claim 1, further comprising an antibiotic.

5. The culture medium of claim 1, further comprising yeast extract.

6. The culture medium of claim 1, further comprising a salt.

7. The culture medium of claim 1, further comprising a carbohydrate.

8. The culture medium of claim 1, further comprising additional amino acids.

9. The culture medium of claim 1, further comprising one or more metal ions, vitamins, or cofactors.

10. The culture medium of claim 1, further comprising at least one buffer selected from $CaCl_2 \cdot 2H_2O$, $MgSO_4 \cdot 7H_2O$, $NaH_2PO_4 \cdot 2H_2O$, sodium pyruvate, 4-(2-hydroxyethyl)-1-piperazineethanesulfonic acid (HEPES), and 3-(N-morpholino)-propanesulfonic acid (MOPS) in an amount sufficient to maintain the medium within the pH range of 6.5-7.5.

11. A method of viral propagation, comprising,
a) culturing avian embryonic cells in the culture medium of claim 1,
b) establishing an adherent or non-adherent cell culture of the avian embryonic cells capable of proliferating in the basal medium free of human or animal protein,
c) infecting the avian embryonic cells with a virus selected from poxvirus or poxvirus vector, infectious bursal disease virus, Rispens, SB-1, Turkey Herpesvirus (HVT), or any Marek's serotype 1, 2, or 3 viral vector when the cell density reaches at least $1.0 \times 10^6$ cells/mL,
d) culturing the infected avian embryonic cells in the culture medium of claim 1 until cytopathic effect (CPE) reaches at least 50%, and
e) harvesting the virus.

\* \* \* \* \*